Sept. 23, 1941. T. J. BURKE 2,256,664
COFFEEPOT
Filed July 15, 1940
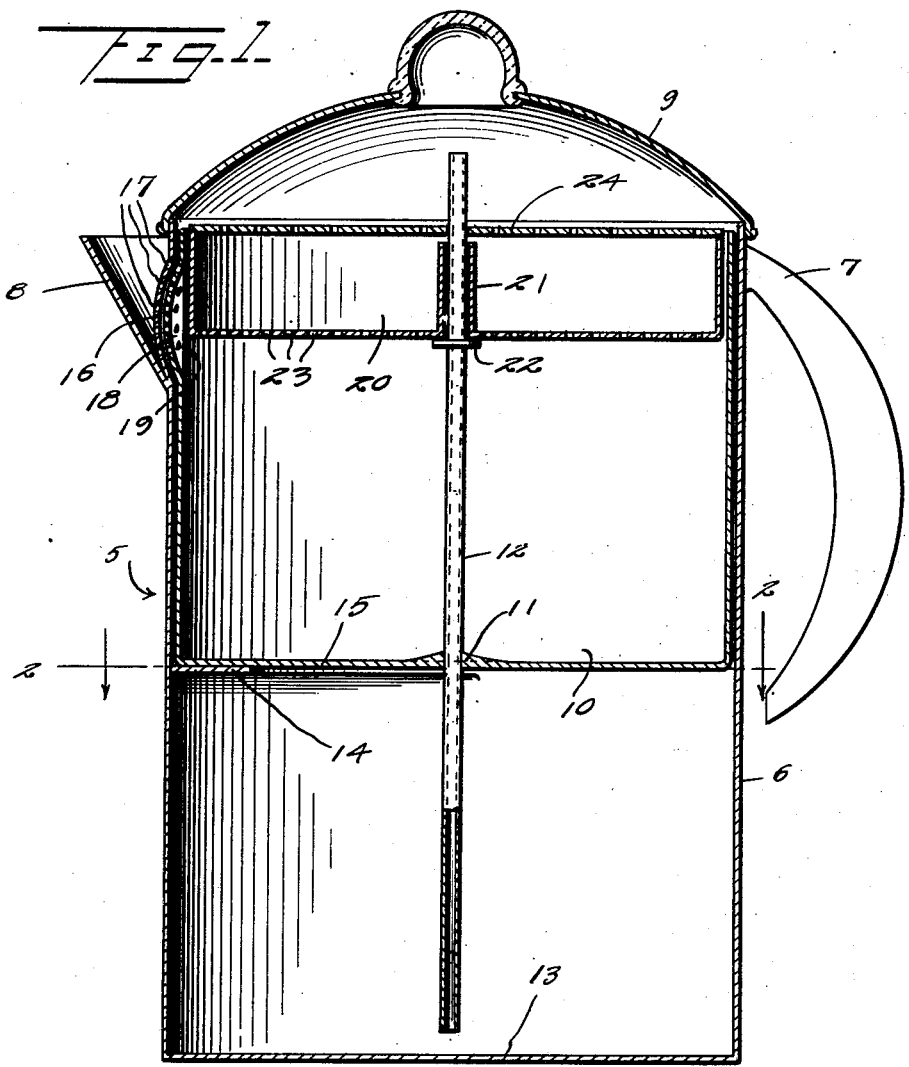
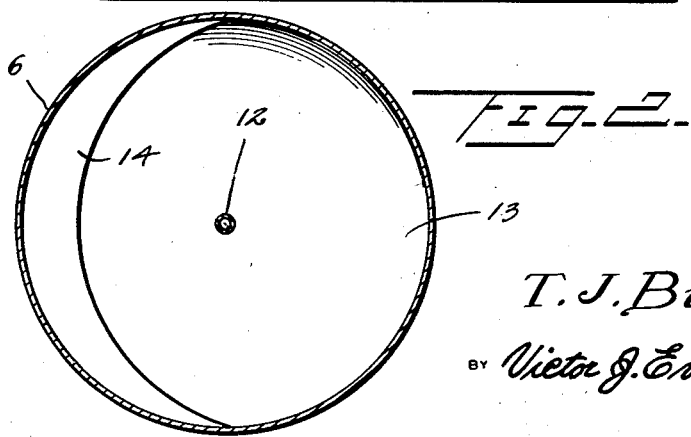
T. J. Burke
INVENTOR
BY Victor J. Evans & Co.
ATTORNEYS Patented Sept. 23, 1941

2,256,664

UNITED STATES PATENT OFFICE 2,256,664

COFFEEPOT

Thomas J. Burke, Blytheville, Ark.

Application July 15, 1940, Serial No. 345,686

2 Claims. (Cl. 53—3)

The present invention relates to a new and improved coffee making device.

The primary object of the invention resides in the provision of a coffee pot that combines the advantages of the percolator and drip methods for brewing coffee.

Another object of the invention is to provide a coffee pot which includes an outer casing and an inner chamber, the outer casing constituting a water compartment and the inner chamber collecting and retaining the water after it has percolated from the outer casing through the coffee which is suspended above the inner chamber.

A further object of the invention resides in the provision of a coffee making device having the above characteristics in which means is provided for preventing any residue of water within the outer casing being poured through the discharge spout when pouring the brewed coffee from the inner chamber.

A still further object of the invention is to provide a simple, cheaply constructed, efficiently operating and easily assembled and demounted percolator for family and public usage.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a vertical sectional view of a coffee making device embodying the features of the present invention.

Figure 2 is a horizontal sectional view taken substantially on line 2—2 of Figure 1.

Referring to the drawing for a more detailed description thereof, the improved coffee pot or coffee making device is generally designated by the reference numeral 5 and includes an outer cylindrical-shaped casing 6 to which is attached a handle 7 and opposite said handle there is formed a pouring spout 8. A cover 9 of conventional construction is frictionally held on the upper end of the casing 6 to form a closure for said casing.

An inner chamber 10 is disposed within the casing 6, said inner chamber being welded or otherwise secured as indicated at 11 to a liquid transfer tube 12. One end of the tube 12 terminates adjacent the bottom wall 13 of the casing 6 and the other end extends into the cover 9. The chamber 10 is supported within the casing 6 by means of a crescent-shaped flange 14 formed integral with and extending inwardly of said casing. The flange 14 forms a shelf-like support for the inner chamber 10. As more particularly shown in Figure 1 of the drawing, the inner chamber 10 is substantially one-half the size of the casing 6 and is supported within the casing so that the bottom wall 15 of said chamber is spaced an appreciable distance from the bottom wall 13 of the casing for a purpose to be hereinafter described.

The area of the casing 6 adjacent the pouring spout 8 is convexed as indicated at 16, said convexed area being formed with a plurality of perforations 17. Likewise, the area of the inner chamber 15 is correspondingly convexed as indicated at 18, said convexed area being formed with a plurality of perforations 19 which are adapted to register with the perforations 17 for pouring brewed coffee contained within the chamber 10. The material of which the chamber 10 is formed is somewhat flexible thereby permitting removal of the chamber 10 from the casing 6, it being understood that the convexed area 18 will flex inwardly upon withdrawing the chamber from the casing. However, a slight rotation of the chamber 10 relative to the chamber 6 will bring the perforations 17 and 19 out of registry and the convexed area 18 will bind against the straight wall of the casing 6. As is to be understood, however, whenever desiring to pour the brewed coffee from the chamber 10 it is necessary that the perforations 19 register with the perforations 17.

A cylindrical-shaped coffee retaining basket 20 has a tubular portion 21 adapted for engagement with the tube 12, a flange 22 being formed on the latter for retaining the basket in position. The basket 20 is of conventional construction being provided with a multiplicity of openings 23 for permitting the passage of water into the chamber 10. A perforated closure plate 24 is detachably secured to the upper edge of the basket 20.

When using the device for making coffee, the required amount of water will first be placed in the casing 6 after which the required amount of coffee will be added to the basket 20. With the parts in the assembled relation as shown in Figure 1 of the drawing, as the water within the casing 6 boils it will pass up through the liquid transfer tube 12 and be discharged onto the perforated cover 24. The water will then pass through the coffee held within the basket 20 and drip through the perforations 23 into the chamber 10. It is important to note that the water after entering the chamber 10 is no longer subjected to a boiling action and that boiling water is being discharged from the upper end of the tube 12 for contact with and passage through the coffee contained within the basket 20. Thus the water passing through the coffee is of a proper temperature for best results. However, after passing through the coffee it is no longer subjected to a boiling action. Substantially all of the water held within the casing 6 will be evacuated, there remaining a small quantity of water which will be below the end of the tube 12 to prevent burning of the casing. After a proper interval of time all of the water passing from the casing will flow through the coffee basket into the chamber 10. When dispensing the brewed coffee from the device the handle will be engaged and the pot tilted in the usual manner to effect discharge of the brewed coffee through the spout 8. Provision of the flange 14 will prevent the water which remains in the casing 6 from being discharged through the spout as the pot is tilted.

Thus it will be seen that there has been designed a coffee pot in which the water initially percolates in the manner of the conventional percolator. The distinguishing difference between the present invention and the conventional percolator resides in the fact that the water after contacting the coffee is no longer subjected to a boiling action thereby giving the brewed coffee the essence and flavor of coffee made from the drip method. The chamber 10 is spaced a sufficient distance above the bottom wall of the casing 6 to avoid any possibility of the brewed coffee contained therein being boiled by the residue of water remaining in the casing.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A coffee pot of the character described comprising, an outer casing for containing water, said casing being formed with a pouring spout adjacent its upper end, the portion of said casing confined by said spout being convexed and formed with a plurality of perforations, a liquid transfer tube supported substantially centrally of said casing, an inner chamber carried by said tube and held spaced from the bottom wall of said casing, said inner chamber having a portion of its upper end convexed and formed with a plurality of perforations adapted to register with the perforations of said outer casing, means formed on said casing for supporting said chamber, and a coffee retaining basket supported on said tube within said chamber, whereby water within said casing will be discharged through said tube and after passing through the coffee retaining basket will be collected in said inner chamber.

2. A coffee pot of the character described comprising, an outer casing for containing water, said casing being formed with a pouring spout adjacent its upper end, the portion of said casing confined by said spout being convexed and formed with a plurality of perforations, a liquid transfer tube supported substantially centrally of said casing, an inner chamber surrounding said tube and fixedly secured thereto, said inner chamber being held spaced from the bottom wall of said casing and having a portion of its upper end convexed and formed with a plurality of perforations adapted to register with the perforations of said outer casing, a substantially crescent-shaped flange formed integral with and extending inwardly of said casing for supporting said chamber, and a coffee retaining basket supported on said tube within said inner chamber, whereby water within said casing will be discharged through said tube and after passing through the coffee retaining basket will be collected in said inner chamber.

THOMAS J. BURKE.